United States Patent [19]

Napor et al.

[11] 3,741,150

[45] June 26, 1973

[54] AUTOMATIC FLUX SPRAY DISPENSER

[75] Inventors: Carl A. Napor, Glen Ridge; Charles G. Krumm, Wyckoff, both of N.J.

[73] Assignee: Kahle Engineering Co., Union City, N.J.

[22] Filed: June 9, 1971

[21] Appl. No.: 151,360

[52] U.S. Cl............................ 118/2, 118/9, 118/302, 118/323
[51] Int. Cl. .......................... B05c 5/00, B05c 11/10
[58] Field of Search......................... 118/2, 302, 410, 118/323; 222/318; 239/125, 127

[56] References Cited
UNITED STATES PATENTS

| | | | |
|---|---|---|---|
| 1,407,729 | 2/1922 | Buckminster | 118/2 |
| 2,701,542 | 2/1955 | Tench | 118/2 |
| 3,550,552 | 12/1970 | Archebald | 118/302 X |

FOREIGN PATENTS OR APPLICATIONS

| | | | |
|---|---|---|---|
| 925,883 | 5/1963 | Great Britain | 118/410 |

Primary Examiner—John P. McIntosh
Attorney—Norman N. Holland

[57] ABSTRACT

An improved automatic fluxing system is disclosed for applying flux to articles on a production line basis. The system includes an automatic spray gun with a movable mounting for directing the flux onto articles being presented to the spray gun by a conveyor. The system includes automatic nozzle controls and a flux supply system for the nozzle, particularly adapted for handling corrosive, abrasive and highly viscous fluxes. The flux supply system includes a special pump for continuously circulating flux in the reservoir in addition to continuously supplying flux to the nozzle. The circulating reservoir eliminates the need for flux agitators and also permits the flux to be heated and maintained at a uniform pre-set temperature making the flux supply independent of pump induced temperature variations and of temperature related viscosity changes.

3 Claims, 7 Drawing Figures

INVENTORS
Carl A. Napor
Charles G. Krumm

ATTORNEY

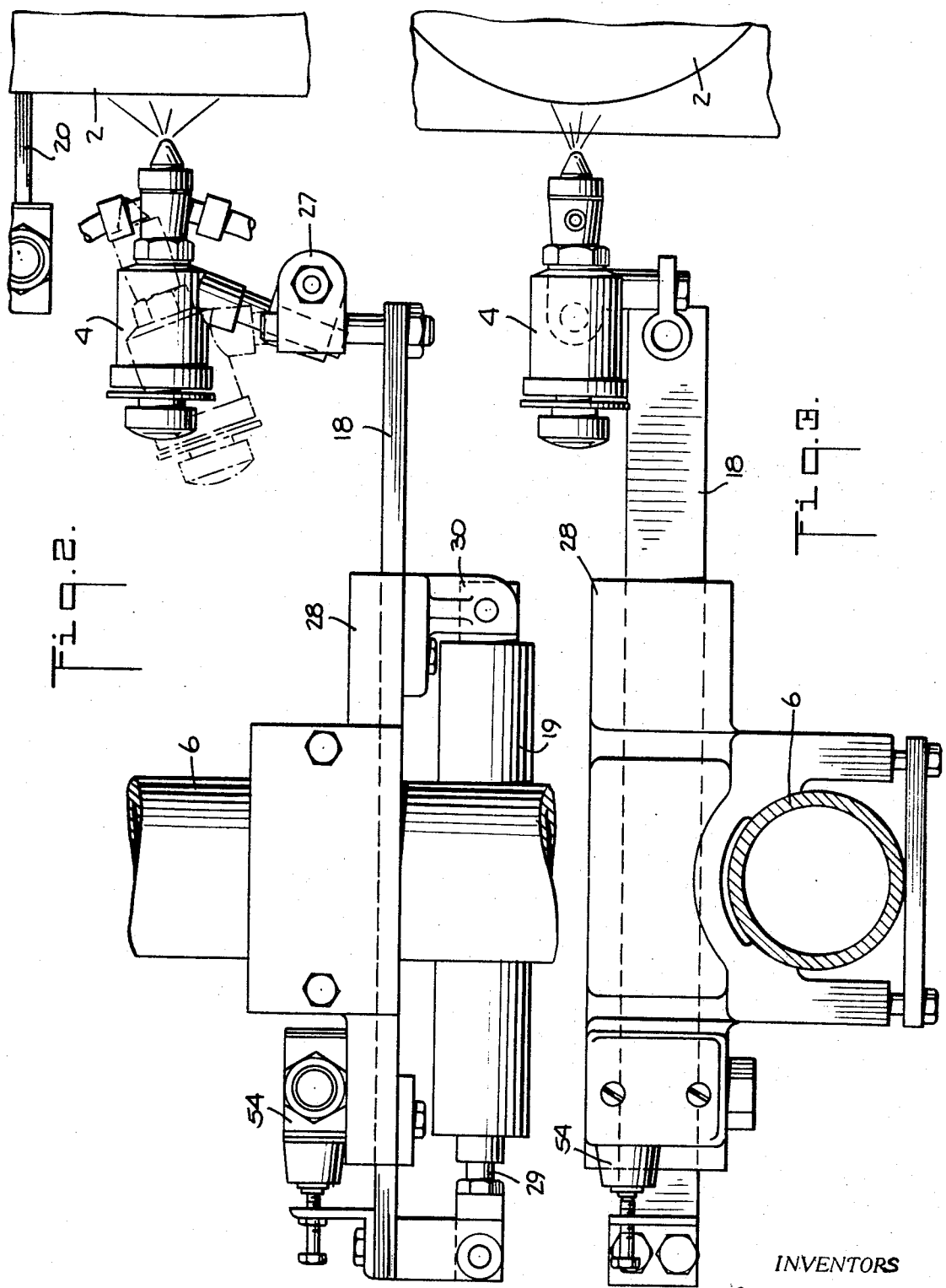

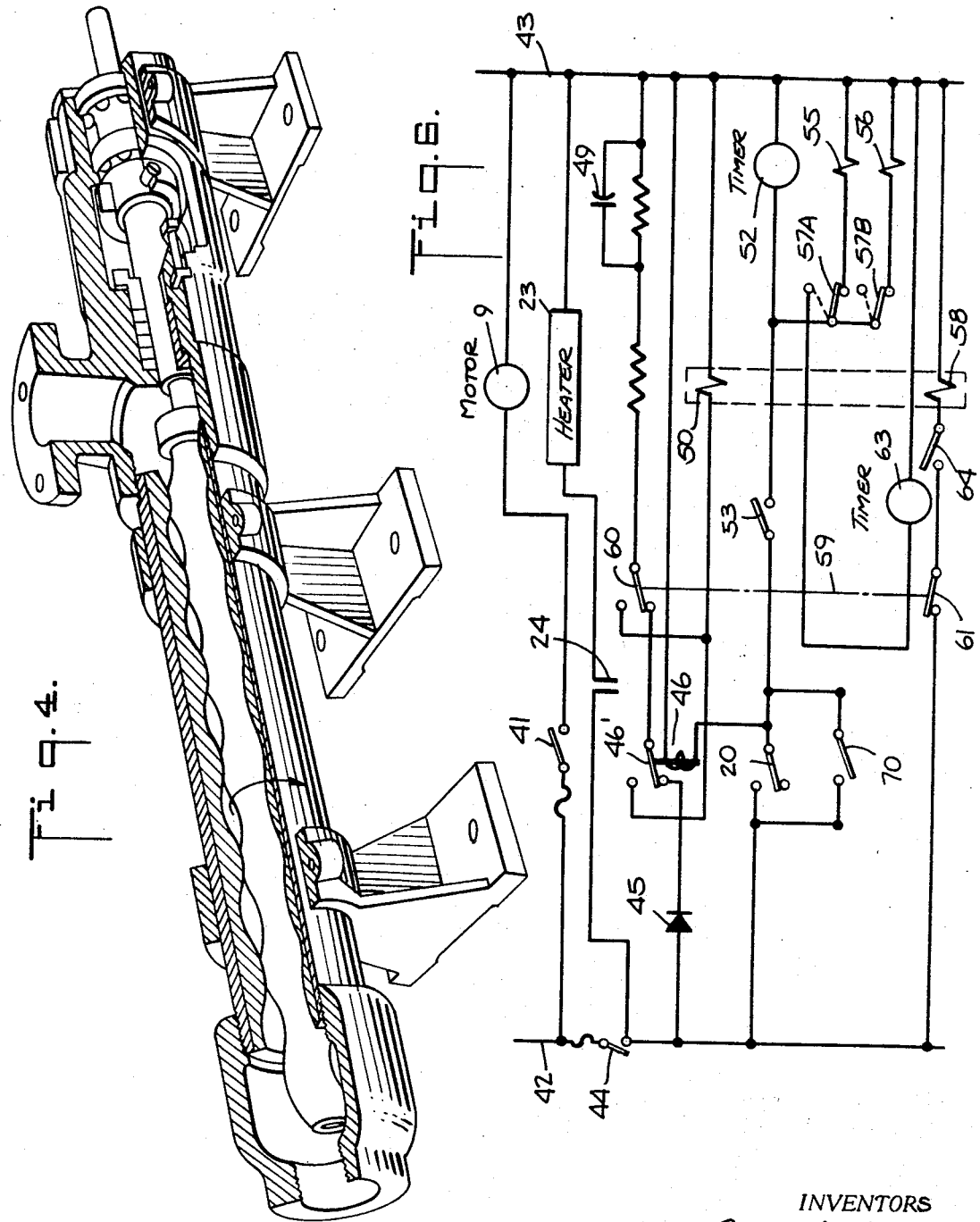

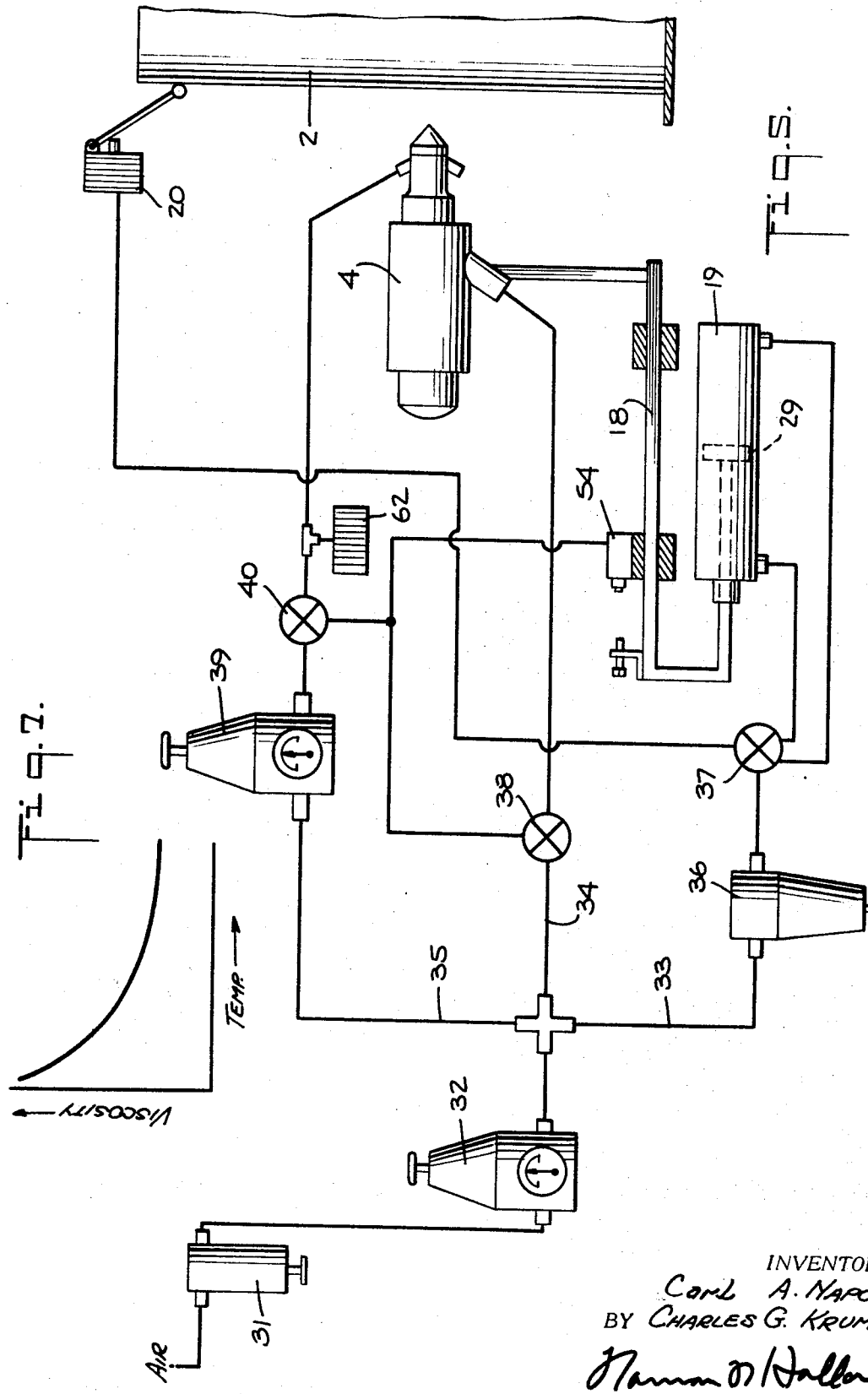

AUTOMATIC FLUX SPRAY DISPENSER

BACKGROUND OF THE INVENTION

Continuing developments in more highly automated production lines which include brazing or other fastening operations require the use of related automatic fluxing systems for spraying an appropriate flux onto articles being handled.

Certain of these operations, in particular, require the use of fluxes which may be corrosive or abrasive or both and which may also be highly viscous so that the feeding and spraying of the fluxes is difficult and has not been successfully automated to date. Accordingly, the object of the present invention is to provide an improved automated fluxing system for operation under the above noted conditions.

Prior automatic fluxing systems have utilized conventional spray systems with regular nozzle equipment and flux reservoirs and attempts to utilize these prior systems with corrosive and abrasive and viscous fluxes have resulted in objectionable corrosion and wear as well as in difficulties in maintaining proper spray patterns and uniformly mixed flux supplies.

The present invention includes a special dual flux feed system utilizing an abrasion and corrosion-resistant pump of constant output supplying a dual flux circulating system where a first circulating loop continuously feeds a spray nozzle and where a second continuously circulating loop continually passes the flux through a reservoir thereby maintaining it at a pre-set temperature and with a uniform mixture and viscosity. This flux supply system is combined with an improved nozzle mounting and control providing a timed nozzle positioning movement to directly apply flux to the necessary areas of the articles and to conserve flux by providing precisely controlled and positioned flux patterns.

Accordingly, an object of the present invention is to provide an improved fluxing system particularly adapted for use with corrosive, abrasive and highly viscous fluxes.

Another object of the present invention is to provide an automated fluxing system for viscous fluxes having an improved pumping and storing means for the fluxes.

Another object of the present invention is to provide for improved spray pattern control to conserve flux.

Another object of the present invention is to provide an improved automated fluxing system of compact form suitable for direct placement in an automated brazing or other fastening operation.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 2 is an enlarged detailed side elevational view of the nozzle and its movable support.

FIG. 3 is an enlarged detailed top plan view of the nozzle and support of FIG. 2.

FIG. 4 is a perspective view, partially cut away, illustrating a preferred embodiment of the flux reservoir system pump.

FIG. 5 is a diagrammatic illustration of the nozzle spray and positioning air supply system.

FIG. 6 is a schematic illustration of a preferred embodiment of the fluxing system electrical circuit.

FIG. 7 is a viscosity versus temperature curve for a typical brazing flux.

DESCRIPTION OF THE PREFERRED EMBODIMENTS

Figure 1:
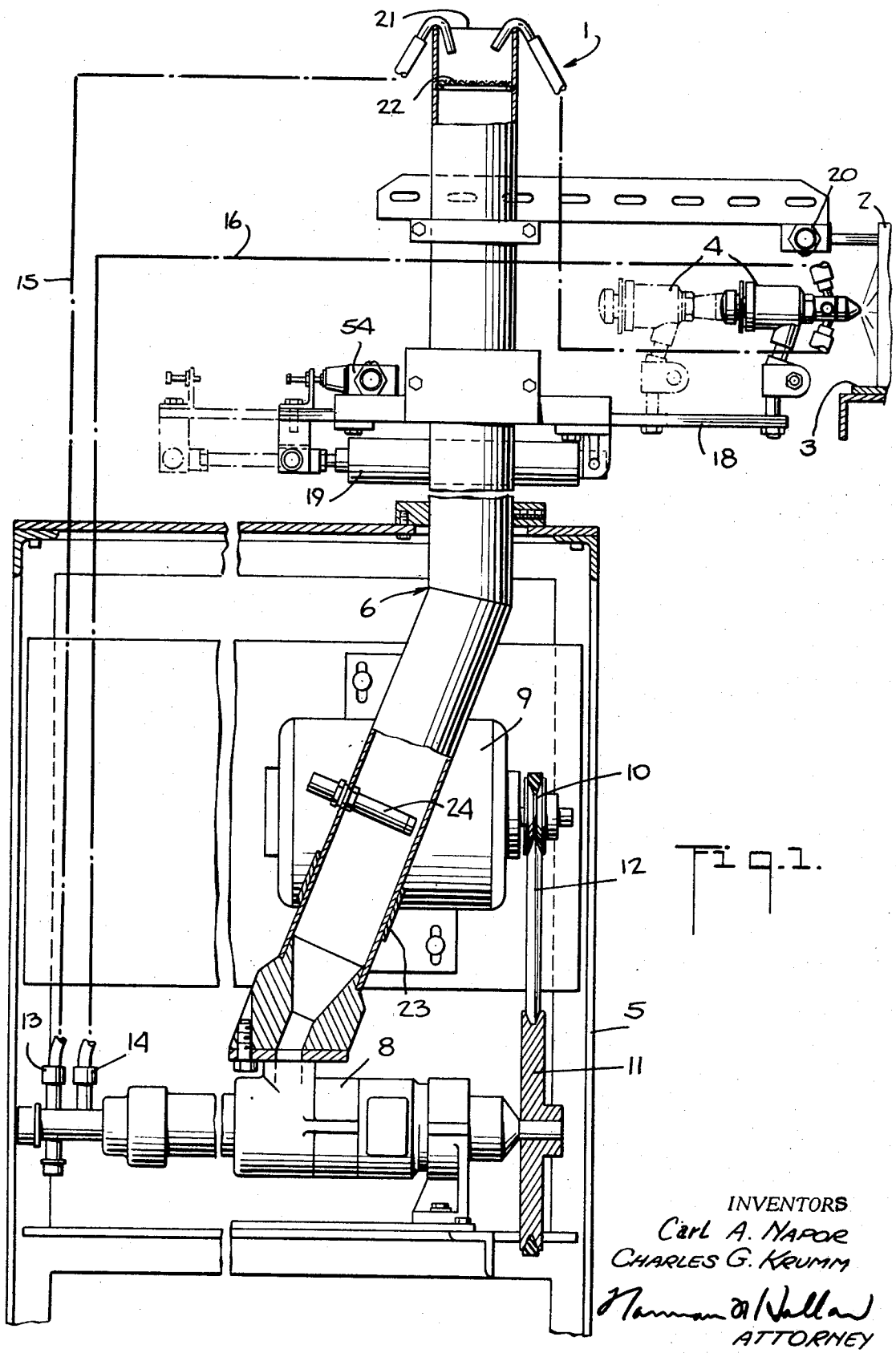
FIG. 1 is a side elevational view partially in section illustrating a preferred embodiment of the automated fluxing system.

The fluxing system 1 will first be generally described with particular reference to FIG. 1. At the right-hand side of FIG. 1, an article 2 is shown being presented to the fluxing system 1 on a conveyor or other support 3. The fluxing system 1 is seen to be positioned adjacent to the conveyor 3 with a flux spraying nozzle 4 mounted above a base or cabinet 5 which supports the nozzle 4 as well as the related flux supplying reservoir 6 and the system controls.

An important part of the flux supply system is the generally vertical pipe-like reservoir 6 which contains a supply of flux material and which is seen to be attached to the cabinet 5 by suitable means including a coupling 7 at the cabinet top. This hollow pipe-like reservoir 6 communicates with a flux circulating pump 8 mounted at the bottom of the cabinet 5 and driven by a suitable electric motor 9 coupled to it by means of pulleys 10 and 11 and a coupling belt 12. As will be described more fully below, the output end of the pump 8 has a pair of fluid outlets 13 and 14. The first of these outlets 13 carries the flux upwardly through a suitable connecting hose 15 to the top of the reservoir 6. Flux passing through the hose 15 returns downwardly into the reservoir 6 so that a continually circulating supply of the flux material is maintained within the reservoir 6. The second output 14 feeds a supply of flux through a hose 16 to the nozzle 4 and this flux line also includes a return hose line 17 from the nozzle 4 to the reservoir 6. This provides a continually circulating flux supply for the nozzle 4. The nozzle 4 is mounted on a horizontally reciprocable slide 18 which moves the nozzle 4 toward and away from the conveyor 3 as necessary and permits it to move close to and to enter recessed portions of the article 2 as a result of this motion. The slide 18, together with the related air motor 19 and other controls, are adjustably positioned on the vertical upper portion of the flux reservoir 6. An article-detecting microswitch 20 or other sensor for operating the nozzle 4 motion and the spray cycle is adjustably positioned on the cabinet. In the preferred embodiment illustrated, the microswitch 20 is adjustably coupled for axial and rotational adjustment on the upper vertical portion of the flux reservoir 6.

THE FLUX RESERVOIR AND PUMPING SYSTEM

In order to maintain a constant supply of flux at a uniform viscosity and pressure at the nozzle 4, a preferred flux reservoir and supply system are incorporated in the fluxing system. This system is best illustrated in FIGS. 1 and 4.

As already indicated, the fluxing system in accordance with the present invention is particularly adapted for handling relatively viscous flux materials of a type particularly useful for brazing and similar operations. The preferred reservoir in the present system comprises the generally vertical pipe-like reservoir 6 having its lower end coupled to the circulating pump 8. In order to maintain the flux at a uniform viscosity and with a homogeneous mixture, a portion of the flux is continuously circulated through the hose 15 connecting the pump outlet 13 and the open upper end 21 of the flux reservoir 6. This circuit including a filter screen 22 provides for the continual circulation and a continuous mixing of a significant portion of the flux stored in the reservoir 6. The second pump outlet 14 is coupled by the hose 16 to the nozzle 4 and also returns the flux to the open upper portion of the reservoir 6 through line 17. The flux supply line 16 feeds an adequate supply of flux to the nozzle 4 during nozzle operation when the nozzle 4 is opened and further facilitates the mixing operation by continually returning this portion of the flux supply to the reservoir 6 when the nozzle 4 is closed.

Typical fluxes used for brazing may be relatively viscous at room temperature while having a less viscous and a more stable viscosity at an elevated temperature. In addition to maintaining a uniform mixing, the above described circulation also exposes the flux to a heater 23 which maintains the circulating flux at a desired elevated temperature under the control of a thermostat 24. The viscosity versus temperature characteristics of typical fluxes also have been found to have temperature zones where only minor viscosity variations occur corresponding to relatively wide temperature changes. By adjusting the heating system to hold the flux in these temperature zones, the viscosity variations due to inevitable changes are minimized.

FIG. 7, for example, illustrates in a qualitative way a viscosity versus temperature relationship for a typical brazing flux. At the elevated end of the temperature scale, the curve is seen to be relatively flat. With the heater set to hold the flux at about the center of the temperature zone shown, it will be seen that flux temperature variations in the hoses and at the nozzle 4 will not significantly change the viscosity.

A further advantage of maintaining the flux at an elevated and uniform temperature is the elimination of any possible variations in flux viscosity caused by random pump-related heating of the flux.

A preferred form of pump 8 is illustrated in FIG. 4 which is capable of circulating the liquid flux with a relatively constant pump pressure output and which resists wear or corrosion from typical corrosive and abrasive flux materials. The pump 8 illustrated in FIG. 4 is seen to have only two principal portions in contact with the flux. These are the generally spiral shaped rotor 25 and a related generally spiralled shaped stator 26. Both elements are readily manufactured from materials chosen to resist abrasives in the particular flux liquid being used as well as for being corrosive resistant to the particular flux being handled. A substantially constant liquid output pressure results as the turning rotor carries the flux in advancing pockets through the pump stator 26.

One such progressing cavity-type pump is commercially available from Robbins & Myers, Inc. of Springfield, Ohio.

THE SPRAY NOZZLE AND NOZZLE MOUNTING

The preferred spray nozzle 4 is a two fluid or atomizing type of nozzle which is particularly useful for spraying viscous liquids. Such nozzles are commercially available which include a valve operated liquid control stem as well as a valve operated inlet for admitting the atomizing or spray forming air to the nozzle head. With the nozzle in its off position and with the stem and air valves closed, the liquid flux may be continually passed through the nozzle 4 chamber under pressure so that it remains uniformly mixed and instantly available for spraying when a spray signal is received at the nozzle by the electrical system to be further described below.

In order to most effectively position the nozzle 4 with respect to the articles being sprayed, the nozzle 4 is mounted on an automatically operated moving support. This support is best illustrated in FIGS. 2 and 3. It includes an adjustable bracket 27 attached to the end of the movable arm 18 slidably contained in a bearing 28 adjustably positioned on the pipe-like flux reservoir 6. The slide arm 18 is moved towards and away from the article being sprayed by an air cylinder 19 having its piston 29 coupled to the arm 18 and having its cylinder attached to the mounting bracket 30. The piston 29 is operated under the control of an internal air valve which in turn is controlled by an electrical detecting system further described below and including the article sensing switch 20 adjustably positioned to detect the arrival of the article 2 at the spray position. When an article 2 engages the sensing arm of the sensing switch 20, the air cylinder 19 operates to remove the nozzle 4 into its spray position adjacent the portion of the article 2 which is to be brazed or otherwise treated. As will be covered in the description of this electrical control circuit, the nozzle 4 is returned to its withdrawn position after a predetermined time set by an adjustable timing means.

THE SYSTEM CONTROLS

FIG. 5 is a diagrammatic illustration of the air supply system for the flux spraying nozzle 4 and for operating the nozzle air cylinder 19. A source of air under pressure is fed through a suitable filter 31 and a pressure regulator 32. The output of the regulator 32 is directed through three separate air supply lines including a first line 33 for supplying the operating air for the air cylinder 19, a second line 34 for operating the control valve within the flux spraying nozzle 4 and a third line 35 for supplying the atomizing air for the flux spraying nozzle 4.

The first of these lines 33 is seen to pass through a lubricating device 36 for furnishing a suitable lubricating mist to the air powering the nozzle positioning air cylinder 19. This line 33 includes a four-way solenoid control valve 37 which supplies air under pressure to one side of the cylinder piston while venting the opposite side and vice-versa. The solenoid valve 37 is electrically operated by a system controlled by the articles 2 being sprayed, as will be further described in the description of the electrical system which follows.

The central air supply line 34 feeds air to the spraying nozzle 4 for opening and closing the nozzle 4 under the control of a timing system activated by the nozzle motion and includes electrically operated air valve 38.

The electrical system for valve 38 which will also be further described below, supplies nozzle opening air pressure when the nozzle 4 has been moved into position adjacent the article 2 being sprayed. The air remains on for a suitable period under the control of a timer so that a proper flux pattern is deposited on the article 2.

The third or upper air line 35 passes through a second regulator 39 which reduces the pressure and then through a control valve 40 which is operated in parallel with the nozzle control valve 38 to supply atomized air during the spraying cycle.

THE ELECTRIC CONTROL CIRCUIT

FIG. 6 is a schematic diagram of a preferred embodiment of the electrical control system. The pump motor 9 is shown coupled by a suitable starter switch 41 between the AC power supply lines 42 and 43. Immediately below the motor circuit, the additional portions of the electrical system are shown as coupled to the power lines through a control switch 44. When the switch 44 is closed, the electrical heater 23 for the flux reservoir 6 is coupled to the power supply under the control of thermostat 24. The circuit below the heater circuit is a pulse starting circuit including a rectifier 45 coupled through the contacts 46' of control relay 46 and contacts 60 of a disabled switch to an RC pulse storage circuit 48, 49. A charge is stored in the capacitor 49 as soon as the system switch 44 is closed. When an article 2 on the conveyor engages and closes the detector switch 20, relay 46 is energized and its contacts 46' are closed so that a pulse is discharged through the advance coil 50 for the air cylinder valve 37 (FIG. 5) admitting air behind the piston 29 to drive the piston 29 and the attached nozzle 4 to its operative position. Contacts 53 in timer switch 54 are closed by the slide 18 thereby starting the timer 52 and energizing solenoid valves 55 and 56 to operate the spray gun through contacts 57A and 57B. The timer 52 is set to keep its timer contacts 57A and 57B closed (as illustrated) for a pre-set period while the main power is applied to both the control coil 56 of atomizing air valve 40 and the control coil 55 of nozzle control valve 38. While the timer 52 contacts 57A and 57A remain closed, the article 2 will be sprayed with flux for a time period corresponding to the timer 52 setting. When the time period has elapsed, the timer contacts 57A and 57B will move to their dotted position closing valves 38 and 40. This immediately closes the nozzle 4 but atomizing air continues to flow briefly from air chamber 62 to assure that all flux is clear of the nozzle. The shifting of contacts 57A starts timer 63 whose contacts 64 close after a delay period to energize retract coil 58 of relay 37 to return the nozzle slide 18.

As the air cylinder 19 returns slide 18 to its withdrawn position and the article 2 moves away, detector switch 20 will reopen causing the timer 52 to reset for the next cycle.

A disabling switch 59 is shown with a pair of contacts 60 and 61. When this switch 59 is moved from the position shown, its contacts 60 will cause the air cylinder to move and to remain in its extended position since a signal pulse will have been supplied to the advanced coil 50 through contacts 60 and since the open contacts 61 will prevent the return coil 58 from being energized.

Switch 70 represents an external control which may be a foot switch or other control switch which will operate the spray independently of the detector switch 20.

It will be seen that an improved automatic fluxing system is provided for production-line brazing or similar operations. The system is particularly useful and effective in handling relatively viscous as well as corrosive and abrasive fluxes which have not previously been effectively utilized in automatic fluxing systems. A novel combination of an automatically controlled moving nozzle together with a compact efficient flux reservoir permit the system to be incorporated in a compact and relatively inexpensive machine suitable for a variety of spraying operations. A precise control of the flux spray pattern is facilitated by an improved temperature control and a continuously circulating type of flux reservoir which continuously supplied flux to the spraying nozzle at a uniform viscosity and temperature.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a fluxing system for spraying a relatively viscous and corrosive liquid coating of flux of predetermined depth and area on articles using a spray nozzle, an improved nozzle mounting and liquid flux supply means comprising the combination of:
    a spray nozzle;
    a relatively tall and narrow reservoir for the liquid flux;
    a thermostatically controlled heater positioned in said reservoir;
    a spiral conveyor pump having a corrosion resistant spiral rotor and having its input coupled to a lower portion of the reservoir;
    a conduit coupling the output of said pump to an upper portion of said reservoir;
    a second conduit coupling said pump output to an upper portion of said reservoir and passing through a fluid supply cavity in said spray nozzle;
    a movable support for said nozzle;
    a drive motor coupled to said nozzle support; and
    control means for said motor and said nozzle including a sensor positioned for activation by the articles.

2. The fluxing system as claimed in claim 1 which further comprises a timer in said control means.

3. The fluxing system as claimed in claim 1 which further comprises a manual control switch coupled in parallel with said sensor.

* * * * *